United States Patent
Blumhofer et al.

(10) Patent No.: US 9,875,540 B2
(45) Date of Patent: Jan. 23, 2018

(54) GENERATION OF A PATIENT-SPECIFIC ANATOMICAL ATLAS

(71) Applicant: Brainlab AG, Munich (DE)

(72) Inventors: Andreas Blumhofer, Neubiberg (DE); Bálint Várkuti, München (DE); Stefan Achatz, Freising (DE)

(73) Assignee: Brainlab AG, Munich (DE)

( * ) Notice: Subject to any disclaimer, the term of this patent is extended or adjusted under 35 U.S.C. 154(b) by 60 days.

(21) Appl. No.: 14/904,309

(22) PCT Filed: Jul. 11, 2013

(86) PCT No.: PCT/EP2013/064636
§ 371 (c)(1),
(2) Date: Jan. 11, 2016

(87) PCT Pub. No.: WO2015/003748
PCT Pub. Date: Jan. 15, 2015

(65) Prior Publication Data
US 2016/0171692 A1    Jun. 16, 2016

(51) Int. Cl.
*G06K 9/00* (2006.01)
*G06T 7/00* (2017.01)
(Continued)

(52) U.S. Cl.
CPC .............. *G06T 7/0014* (2013.01); *G06T 7/33* (2017.01); *G06T 7/337* (2017.01); *G06T 7/60* (2013.01);
(Continued)

(58) Field of Classification Search
CPC ................... G06T 7/60; G06T 7/0014; G06T 2207/20128; G06T 7/90; G06T 7/33; G06T 7/337; G06T 2207/30016
(Continued)

(56) References Cited

U.S. PATENT DOCUMENTS

2006/0104516 A1    5/2006  Lee et al.
2015/0287198 A1*  10/2015  Vilsmeier ............. G06T 7/0014
                                                    382/128

FOREIGN PATENT DOCUMENTS

WO    2012035538    3/2012

OTHER PUBLICATIONS

Jingxin, et al.; "Automated Segmentation of Mouse Brain Images Using Multi-Atlas Multi-ROI Deformation and _abel Fusion"; Neuroinformatics, Springer-Verlag, New York, vol. 11, No. 1, pp. 35-45; XP035160076; New York, MY Oct. 2, 2012.*

(Continued)

*Primary Examiner* — Gregory F Cunningham
(74) *Attorney, Agent, or Firm* — Middleton Reutlinger

(57) ABSTRACT

A medical data processing method of matching a medical image of an anatomical structure of a patient's body with an atlas-based representation of the anatomical structure, the method being constituted to be executed by a computer and comprising the following steps; acquiring patient image data describing a medical image representation of the anatomical structure in the medical image; determining, based on the patient image data, patient substructure data describing a plurality of patient substructure representations each describing a different patient substructure of the anatomical structure; acquiring general substructure data describing a general substructure representation of each of a plurality of general substructures for each of the patient substructures; determining, for each of the patient substructures and based on the patient substructure data and the general substructure data, substructure matching data describing a matching general substructure representation which matches the respective patient substructure representation; determining, based on the general substructure data and the substructure matching data, anatomical structure atlas data describing an atlas representation of the anatomical structure; determining, based on the patient image data and the anatomical structure atlas data, matching transformation data describing an atlas- (Continued)

patient matching transformation between the medical image representation of the anatomical structure and the atlas representation of the anatomical structure.

18 Claims, 3 Drawing Sheets

(51) Int. Cl.
 G06T 7/60 (2017.01)
 G06T 7/33 (2017.01)
 G06T 7/90 (2017.01)

(52) U.S. Cl.
 CPC ...... *G06T 7/90* (2017.01); *G06T 2207/20128* (2013.01); *G06T 2207/30016* (2013.01)

(58) Field of Classification Search
 USPC .......................................................... 382/128
 See application file for complete search history.

(56) References Cited

OTHER PUBLICATIONS

Jingxin, et al.; "Automated Segmentation of Mouse Brain Images Using Multi-Atlas Multi-ROI Deformation and Label Fusion"; Neuroinformatics, Springer-Verlag, New York, vol. 11, No. 1, pp. 35-45; XP035160076; New York, NY Oct. 2, 2012.

Ramus, et al.; "Construction of Patient Specific Atlases from Locally Most Similar Anatomical Pieces"; Medical Image Computing and Computer-Assisted Intervention A Miccai 2010, Springer Berlin Heidelberg, pp. 155-162, Berlin, Heidelberg Sep. 20, 2010

Ericsson, et al.; "Construction of a patient-specific atlas of the brain: Application to normal aging", Biomedical Imaging: From Nano to Macro, 2008; ISBI 2008; 5th IEEE International Symposium on, IEEE, pp. 480-483; Piscataway, NJ May 14, 2008

Olivier, et al.; "Using Frankenstein's Creature Paradigm to Build a Patient Specific Atlas", Medical Image Computing and Computer-Assisted Intervention A Miccai 2009, Springer Berlin Heidelberg, pp. 2-4; Berlin, Heidelberg Sep. 20, 2009.

Zimmer, et al.; "Coupled parametric active contours", Pattern Analysis and Machine Intelligence, IEEE Transactions On, IEEE Service Center, pp. 1838-1842, Los Alamitos, CA Nov. 1, 2001.

European Patent Office, International Search Report for corresponding application PCT/EP2013/064636, pp. 1-7, Rijswijk, Netherlands dated Jul. 3, 2014.

\* cited by examiner

GENERATION OF A PATIENT-SPECIFIC ANATOMICAL ATLAS

The present invention relates to a medical data processing method of matching a medical image of an anatomical structure of patient's body to an atlas-based representation of the anatomical structure. The invention is also directed to a corresponding computer program, a program storage medium storing the program, a computer executing the program and a signal wave carrying information representing the program.

When planning a navigated medical procedure, for example radiotherapy or local-delivery infusion therapy, it is desirable to have a precise model of the anatomy of the patient on which the medical procedure is to be carried out. An atlas, also called anatomical atlas, is understood to represent a generic model of an anatomical structure forming at least part of a human body which is generated based on a statistical analysis of anatomical information (in particular image information) generated from a plurality of human bodies. However, an atlas is in general valid for only one type of patient (for example only for patients of one specific ethnicity or age), and the atlas may therefore not apply to the anatomy of the specific patient (on which the medical procedure has to be carried out) with the desired fit.

A problem to be solved by the invention therefore is to model an anatomical structure of a specific patient by considering atlas information, which model provides for the desired resolution, in particular fit, compared to the specific patient's anatomy.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature. A feature of one embodiment which adds an additional function to another embodiment can in particular be added to said other embodiment.

EXEMPLARY SHORT DESCRIPTION OF THE INVENTION

In the following, a short description of specific features of the present invention is given which shall not be understood to limit the invention only to the features and combinations of features described in this section.

The present invention relates to in particular a method of matching a medical image of an anatomical structure of a patient's body with an atlas representation of that anatomical structure. The atlas representation is generated preferably by partitioning the medical image of the anatomical structure into image parts which each represent parts, in particular non-overlapping parts, of the anatomical structure. For each of these parts, an atlas representation is generated in particular by analysing medical images of anatomical body parts representing the anatomical structure (and which were generated from different subjects). For example, a plurality of such atlas images can be generated for each part of the anatomical structure. The atlas images are preferably generated from a plurality of medical images by determining those medical images which have similar features. From the plurality of atlas images generated for each part of the anatomical structure, an atlas image is determined which best matches the representation of the part of the anatomical structure in the medical image. This procedure is repeated for each part of the anatomical structure, and all the matching atlas images are then joined to generate an atlas representation of the complete anatomical structure. The atlas representation of the complete anatomical structure can then be for example fused to the representation of the anatomical structure in the medical image, for example in order to determine anatomical anomalies in the medical image of the anatomical structure. This allows to for example determine a pathological state in the patient's body.

GENERAL DESCRIPTION OF THE INVENTION

In this section, a description of the general features of the present invention is given.

In order to solve in particular the aforementioned problem, the invention provides a method (in particular a data processing method, more particularly a medical data processing method) of matching the medical image of an anatomical structure of a patient's body with an atlas-based representation of an anatomical structure. The method is preferably constituted to be executed by a computer and comprises the following preferred steps.

Preferably, patient image data is acquired. Preferably, the patient image data has been generated outside of the inventive method. According to another, less preferred embodiment, the process of generating the patient image data (in particular by applying a medical imaging modality) is part of the inventive method. The patient image data describes in particular a medical image representation of the anatomical structure in the aforementioned medical image. The medical image representation can be defined in for example two or three dimensions. The patient image data has been generated in particular by applying a medical imaging modality to the anatomical structure, wherein the medical imaging modality is for example x-ray computed tomography, magnetic resonance imaging or ultrasound imaging. The anatomical structure can be any anatomical body part of the patient, for example the anatomical structure is at least one of soft tissue (such as for example at least a part of the brain or an intestinal organ, the lung or the heart) or hard tissue (such as for example bony tissue, such as for example at least part of the skull, or cartilage). The medical image representation describes in particular the spatial properties (such as at least one of position and orientation) and the geometric properties, such as at least one of size—in particular volume—and shape of the anatomical structure. Furthermore, the medical image representation is also defined by (and in particular describes) representation class information describing at least one of colour values (for example grey scale values) and contrast values of image elements (pixels or voxels) of the medical image. The representation class information furthermore preferably contains information about an association of the at least one of contrast values and colour values with specific physical structures (which may comprise for example fluids, such as liquids or gases, or tissue, in particular soft tissue and hard tissue) for the medical imaging modality which was used to generated the patient image data. The representation class information therefore describes in particular the influence of the generating process for generating the patient image data on the representation of the physical structure which is imaged. This influence is represented for example by a parameter set (such as for example scanning parameters), in particular the type of analytical device used to generate the patient image data and/or the measurement parameters which are set, in particular adjusted, on the analytical device and have an influence on the representation such as the voltage of the x-ray tubes of an x-ray device or a computer tomography (or the magnetic field strength issued by a magnetic resonance tomograph which is used to generate the patient image data). The parameter set represents and in particular comprises one or in particular more parameters which reflect and in particular are parameters which have an influence on the representation (in particular the individual appearance of the image elements in the medical image).

Preferably, patient substructure data is determined based on (in particular from) the patient image data. The patient substructure data describes in particular a plurality of patient substructure representations which each describe a different patient substructure of the anatomical structure. The patient substructure representations are determined from the medical image representation based on for example applying an image segmentation algorithm to the medical image representation and alternative or additionally predetermined atlas information containing a representation of an anatomical structure corresponding to the anatomical structure of the patient's body. The patient substructure is a substructure of (in particular part of, more particularly any part of, and not the complete) anatomical structure. In particular, the patient substructure is described by a set of image information which is a (real) subset of the image information describing the complete anatomical structure, the subset being smaller than the set of image information describing the anatomical structure. In particular, the patient substructure is determined by dividing the anatomical structure into (into preferably spatially disjunct, i.e. in particular non-overlapping) regions (which are embodied by in particular volume blocks, for example volume partitions, of for example the volume constituting the anatomical structure) which each constitute one patient substructure. Preferably, the patient substructures which are described by the plurality of patient substructure representations are spatially disjunct. Disjunct in the context of this disclosure means that the substructures do not overlap in space. However, they may share common boundaries (in particular boundary lines or boundary surfaces). This is not considered to constitute an overlap in the sense of the present disclosure. The patient substructure data is generated (in particular determined) preferably by segmenting the patient image data (in particular the medical image representation of the anatomical structure) and alternatively or additionally by recognizing individual anatomical features (such as for example a gyri/sulci pattern or a specific cortical folding structure of the brain or a specific shape of a bone), wherein the individual features of a standard anatomical structure are preferably known to and in particular also acquired by the inventive method. In this way, it is possible to determine patient substructure representations (i.e. medical image representations of patient substructures) each describing a patient substructure which preferably represents a predetermined (preferably well-defined) anatomical substructure. For example, the substructure may be the frontal lobe, whereas the complete anatomical structure may be the brain. Based on detecting for example a specific cortical folding structure in the medical image representation, the position of the frontal lobe in the medical image can be determined, and in particular the extent of the frontal lobe can be defined according to the determined position of the cortical folding structure. Thus, the medical image representation of the frontal lobe can be segmented from the medical image representation of the complete brain.

Alternatively or additionally, the anatomic structure may for example be a femur, and the substructure may be the femoral neck which may be segmented based on predetermined knowledge about for example an angle between the longitudinal axis of the femoral head and the longitudinal axis of the femur body, the directions of which in the medical image may be determined for example by image segmentation (in particular edge detection). Alternatively, the substructure may be an implant which is implanted into the femur and which is segmented based on e.g. a difference in colour values (e.g. grey scale values) in a medical image of the femur and the implant.

Preferably, general substructure data is acquired which describes a general substructure representation of each of a plurality of general substructures for each of the patient substructure. The general substructure data preferably is acquired from atlas data which describes the general substructure representations of the general substructures which correspond to the patient substructures. Further preferably, the general substructure contained in the plurality of general substructures associated with the general substructure representations contained in the general substructures data are spatially disjunct. In particular, the general substructure data describes a plurality of general substructure for each patient substructure, in particular for each type of patient substructure. In particular, the general substructure data contains a plurality of generic models, each model representing a general substructure, for each type of patient substructure. For example, the general substructure data contains a plurality of generic models of the frontal lobe of the brain, wherein each of the plurality of generic models (i.e. each one of the general substructure) has been preferably generated based on anatomical information of patients of the same type (the type being defined by for example at least one of, gender and age). The general substructure data, in particular the general substructure representation, has been generated in particular outside of the inventive method. However, generating the general substructure data may according to an alternative embodiment be part of the inventive method. The general substructure data has been generated based on in particular medical information (for example at least one of physiological and anatomical information) about a plurality of human bodies (in particular a plurality of anatomical structures corresponding to the general substructure), in particular based on a statistical analysis of such medical information. Preferably, that medical information contains medical image information.

Preferably, the patient substructure representation and the general substructure representation are image representations, i.e. representations which can be processed with procedures which are suitable for processing image data.

Preferably, substructure matching data is determined for each of the patient substructures. The substructure matching data describes in particular a matching general substructure representation which matches the respective patient substructure representation. The substructure matching data is preferably determined based on the patient substructure data and the general substructure data. In particular, the substructure matching data describes an assignment of a general substructure representation to a patient substructure representation, wherein the assignment is determined preferably based on a best fit between the general substructure representation and the patient substructure representation. Therefore, a best-fitting general substructure representation out of the plurality of general substructure representations is determined for each one of the patient substructure representations. Preferably, the general substructure data comprises information about the anatomical properties of each general substructure (in particular the type of anatomical structure which it represents), and based on for example the representation class information which is preferably contained in the patient image data, a preliminary selection of the suitable type of general substructure which corresponds to the type of the patient substructure can be effected.

Preferably, the patient substructure data comprises patient substructure feature data which describes a feature of the patent substructure representation. Further preferably, the general substructure data comprises general substructure feature data which describes a feature of each of the general substructure representation. The substructure matching data is then preferably determined based on the patient substructure feature data and the general substructure data. In particular, the patient substructure feature data is compared to the general substructure feature data and the general substructure data is selected from the plurality of the general substructures if it has a feature (as described by the general substructure data) which corresponds to a feature of the patient substructure (as described by the patient substructure data). "Corresponding" in this context means that at least one feature is shared by the general substructure and the patient substructure (in particular is equal between the two or is similar between the two at least to a predetermined degree). In particular, the values associated with each feature are compared between the features of the patient substructure and the feature of each of the general substructures. The feature described by the patient substructure feature data and the general substructure feature data includes at least one of the following:

The geometric properties, in particular at least one of the position and orientation, of the patient substructure and the general substructure and preferably, alternatively or additionally, the spatial properties, in particular at least one of size (in particular volume, shape, inner structure and morphology) of the patient substructure and the general substructure.

The gender, the handedness, the ethnicity, the species, a pathological condition, and a physiological and/or anatomical anormality associated with at least one of the patient substructure and the general substructure.

Image properties (for example at least one of the texture, colour values and contrast, which are described by for example the representation class information) of at least one of the patient substructure representation and the general substructure representation.

Based on for example the patient substructure feature data, a category of the patient substructure can be determined. For example, a specific combination of features (in particular feature values) which are given for the patient substructure, the patient substructure may be assigned to a specific category of substructures. For example, a specific combination of a cortical folding pattern and the size of a frontal lobe may indicate that the frontal lobe is of "Type A". In particular, the category describes a sub-type to which the substructure belongs to for a type of substructure (for example the substructure "frontal lobe") being looked at. Likewise, each one of the plurality of general substructures may be assigned a category (in particular, a category of each of the general substructures is determined) based on the general substructure feature data. The substructure matching data is then preferably determined based on comparing the category of the patient substructure and on the category of the general substructure. In particular, a general substructure out of the plurality of general substructures is then determined to be the matching general substructure if the category of the patient substructure is equal to or similar (in particular to a predetermined degree) to the category of the patient substructure. In particular, a general substructure is determined to be the matching substructure if it is of the same subtype as the patient substructure. Furthermore, a category of the patient may be determined based on the category of the patient substructure. For example, a patient may be assigned to a specific category (for example a category indicating that it is a male or a female patient) if the category of the substructure provides for an in particular unique relationship between the category of the patient substructure (also called patient substructure category) and the category of the patient (also called patient category). For example, all frontal lobes of "Type A" may be associated with female patients, i.e. the patient substructure category "Type A" uniquely indicates that the patient category is "female". The matching general structure may then be determined from a set of general substructures for which is it known that their respective category fulfils a predetermined condition with regard to the patient category, for example if it is known that a specific patient category is associated with only specific categories of general substructures.

Preferably, the general substructure data is acquired based on the following steps:

determining, from a plurality of medical images, a corresponding plurality of individual substructure representations, determining from the plurality of individual substructure representations, a similarity group comprising similar individual substructure representations which share a similar feature, determining, based on the similarity group, the general substructure representation by combining the similar individual substructure representations.

For example, a plurality of, preferably at least three, medical images are provided which each show a representation of the anatomical structure in an individual person's body, wherein each individual person is preferably different from the patient to be assessed using the inventive method. From each of those medical images, a representation (also called individual substructure representation) is determined which corresponds to the patient's substructure. From the set of individual substructure representations thus obtained, a subset of individual substructure representations is determined as the similarity group based on determining those individual substructure representations which are similar to each other with regard to at least one criterion. The criterion is in particular that the individual substructure representations share at least one feature (also called similar feature). The feature may for example be one of the features described by the patient substructure feature data. This feature is assessed with regard to the individual substructure representations. It is therefore not necessary to use the patient substructure feature data and the general substructure feature data to implement this embodiment. However, this embodiment may also be implemented in combination with using the patient substructure feature data. Information about the feature or features used to determine the similar individual substructure representation may also be acquired based on the user input or by image analysis of the individual substructure representations, for example by determining their image properties (in particular based on applying an image segmentation algorithm to the individual substructure representations). The general substructure representation is then determined by combining, for example merging, the similar individual substructure representations.

The merging is preferably implemented by averaging the similar individual substructure representations, for example by adding them and dividing them by the number of similar individual substructure representations. Alternatively or additionally, the combining can also comprise applying a rigid fusion algorithm to the similar individual substructure representations, wherein the rigid fusion algorithm preferably permits a scaling (i.e. a change in size without a change in shape) of the similar individual substructure representations, and then averaging the fusion result overall image elements (in particular pixels and/or vossels) of the fused similar individual substructure representations.

The atlas representation of the anatomical substructure is preferably determined, irrespective of the way of determining the general substructure representations, based on assembling it from the general substructure representations. In doing so, general substructure representations representing hard (in particular relatively harder) tissue are preferably assembled first since they are considered to be a boundary condition for the placement of general substructure representations representing soft (in particular relatively softer) tissue structures. The general substructure representations representing soft (in particular relatively softer) tissue structure are then preferably assembled after assembling the general substructure representations representing hard (in particular relatively harder) tissue structures. After assembling the general substructure representations for both types of tissue, the atlas representation of the anatomical structure is received as a result. Taking the brain as an example, first general substructure representations representing white brain matter are assembled, then general substructure representations representing grey brain matter are assembled, and then general substructure representations representing cerebro spinal fluid are assembled. Adding the results of each assembly procedure then leads to the atlas representation of the brain.

Alternatively or additionally to determining the substructure matching data based on the patient substructure and the general substructure feature data, the substructure matching data is preferably determined based on determining a substructure matching transformation. In particular, the substructure data may be determined based on the substructure matching transformation. Alternatively or additionally, determining the substructure matching data includes determining the substructure matching transformation. The substructure matching transformation is in particular a matching transformation between the patient substructure representation and the matching general representation. In the framework of this disclosure, a matching transformation is understood to be a mapping between information contained in a first data set and information contained in a second data set which considers at least one of in particular spatial properties (for example at least one of positions and orientations) and geometric properties (for example at least one of size—in particular volume—and shape) described by the information in the first data set and the information described in the second data set. The mapping may take the form of a linear mapping which can be embodied by a linear mapping matrix. The parameters of such a mapping (for example the entries of the mapping matrix) constitute a measure of similarity of the spatial geometric properties described by the information in the first data set and the second data set, respectively. For example, a mapping matrix which is equal to unity indicates that both the first and the second data set describe identical positions and therefore in particular also identical shapes. The matching transformation is preferably determined for a plurality of general substructures. For example, the matching transformation is determined between a specific patient substructure representation and each one of the general substructure representations, and this process is repeated for each one of the patient substructure representations. The matching transformation which then fulfils a predetermined condition (e.g. which indicates the best (in particular highest) similarity between the patient substructure representation and a general substructure representation) indicates that the associated general substructure is the matching general substructure which matches the specific patient substructure representation. The associated general substructure representation is then determined (in particular selected) to be the matching general substructure representation.

Preferably, anatomical structure atlas data is determined based on the general substructure data and the substructure matching data. The anatomical structure atlas data describes in particular an atlas representation of the anatomical structure. In particular, the anatomical structure atlas data is determined based on joining the matching general substructure representations which have been determined in each of the patient substructure described by the plurality of patient substructure representation. Joining the respectively matching general substructure representations is understood to include in particular a juxtaposition of the matching general substructure representation next to one another. Such a juxtaposition is designed to in particular resemble the positions of the patient substructures relative to one another in particular as they are described by the medical image representation. According to one embodiment of the invention, determining the matching general substructure does not involve deforming the matching general substructure representation to fit the patient substructure representation. In this case, the substructure matching transformation may be for example a rigid elastic fusion function. In another embodiment of the present invention, the matching general structure representation may be deformed (in particular scaled in size and changed in shape) in order to fit the patient substructure representation at least to a predetermined degree of similarity. In this case, the substructure matching transformation is embodied in particular by an elastic fusion function.

Preferably, the matching general structure representations are joined based on representation class information about in particular tissue types described by the matching general substructure representations. Further preferably, the matching general substructure representations are joined based on also representation class information representation about in particular tissue types described by the patient substructure representation. This provides for the advantage that matching general substructures are placed at positions relative to one another when determining the anatomical structure atlas data which anatomically make sense such that in particular the atlas representation of the anatomical structure resembles the medical image representation of the anatomical structure. Thereby, a patient-specific atlas representation of the anatomical structure can be generated which will most likely be more similar to the medical image representation of the anatomical structure than a standard predetermined general representation of the anatomical substructure contained in an atlas describing the whole anatomical structure in one part. In particular, the atlas representation of the anatomical structure is—according to the present invention—built from individual general substructure representations which have been matched on a low scale with individual constituents of the medical image representation (namely the patient substructure representations) which in the end leads to a higher degree of accuracy of the atlas representation of the anatomical structure. Thus, the present invention generates in particular an atlas representation which fits well for the individual patient and reduces inaccuracies which may be due to including average errors as would be the case if one contiguous atlas representation of the anatomical structure were chosen from a given complete atlas describing the whole anatomical structure in one piece.

Preferably, the atlas representation of the anatomical structure includes (in particular is) an atlas image representation of the anatomical structure. In particular, such an atlas image representation is also described by representation class information as it is defined above with regard to the medical image representation.

In particular if the matching general structure representation is not deformed in order to fit to the patient substructure representation, empty spaces may occur between the matching general substructure representations which are joined to form the atlas representation of the anatomical structure. Such empty spaces are preferably compensated for by for example introducing predetermined space compensator representations into those empty spaces. Such predetermined space compensator representations may be for example seed data structures which are expanded to fill the empty spaces. Alternatively or additionally, the empty spaces are compensated for by adapting the boundaries of neighbouring matching general structure representations to one another, in particular by deforming neighbouring matching general structure representation such that they touch one another. Thereby, the atlas representation of the anatomic structure may be given one continuous volume. Thereby, the simulation of the real anatomical conditions present in the patient substructure is improved.

Preferably, matching transformation data describing an atlas-patient matching transformation is determined based on the patient image data and the anatomical structure atlas data. The atlas-patient matching transformation is in particular a transformation between the medical image representation of the anatomical structure and the atlas representation of the anatomical structure. The atlas-patient matching transformation is preferably embodied by an elastic fusion which maps the atlas representation onto the medical image representation and preferably also deforms the atlas representation to create a best fit of the atlas representation to the medical image representation. Thereby, the position with which the anatomical conditions in the anatomical structure as described by the medical image representation as imitated can be enhanced. Furthermore, for example a treatment plan such as a radiotherapy plan or a local delivery infusion therapy plan can be adapted to suit the conditions present in the real anatomical structure. The atlas-patient matching transformation is in particular useful to determine the quality of the atlas representation with regard to the medical image representation, i.e. whether the atlas representation fits to the medical image representation with a predetermined accuracy. According to a specific embodiment, a corresponding step of determining the accuracy of this fit is implemented in the inventive method. Besides that, the atlas-patient matching transformation can be used to determine anormality such as a pathological structure in the medical image representation since the atlas representation is considered, from a medical point of view, as representing the normal anatomical conditions in an anatomical structure corresponding to the anatomical structure of the patient's body.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

Definitions

In the following, definitions are given for the meaning of specific terminology used in the present disclosure. These definitions form part of the present disclosure.

An atlas typically consists of a plurality of generic models of objects, wherein the generic models of the objects together form a complex structure. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

In the field of medicine, imaging methods are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (so-called medical imaging modalities and/or radiological imaging methods) such as for instance computed tomography (CT) and cone beam computed tomography (CBCT, in particular volumetric CBCT), x-ray tomography, magnetic resonance tomography (MRT or MRI), conventional x-ray, sonography and/or ultrasound examinations, and positron emission tomography. Analytical devices in particular are used to generate the image data in apparatus-based imaging methods. The imaging methods are in particular used for medical diagnostics, to analyse the anatomical body in order to generate images which are described by the image data. The imaging methods are also in particular used to detect pathological changes in the human body. Imaging methods are also called medical imaging methods, imaging modalities or medical imaging modalities.

The method in accordance with the invention is in particular a data processing method. The data processing method is preferably performed using technical means, in particular a computer. The data processing method is preferably constituted to be executed by or on a computer, in particular it is executed by or on the computer. I particular, all the steps or merely some of the steps (i.e. less than the total number of steps) of the method in accordance with the invention can be executed by a computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. In particular, the term "cloud" is used in this respect as a metaphor for the Internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer. The computer is preferably operatively coupled to a display device which allows to display information outputted by the computer e.g. to a user. An example of a display device is an augmented reality device (also called augmented reality glasses) which may be used as goggles for navigating. A specific example of such augmented reality glasses is Google Glass (trademark of Google Inc.). An augmented reality device may be used to both input information into the computer by user interaction and to display information outputted by that computer.

The expression "acquiring data" in particular encompasses (within the framework of a data processing method) the scenario in which the data are determined by the data processing method or program. Determining data in particular encompasses measuring physical quantities and transforming the measured values into data, in particular digital data, and/or computing the data by means of a computer and in particular within the framework of the method in accordance with the invention. The meaning of "acquiring data" also in particular encompasses the scenario in which the data are received or retrieved by the data processing method or program, for example from another program, a previous method step or a data storage medium, in particular for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are in particular detected or captured (for example by an analytical device). Alternatively or additionally, the data are inputted in accordance with the additional step, for instance via interfaces. The data generated can in particular be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, in particular determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device (in particular microeletronic data processing device) comprising means for executing the computer program elements and/or the program in accordance with the invention, in particular a data processing device comprising a digital processor (central processing unit or CPU) which executes the computer program elements, and optionally a volatile memory (in particular a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). A computer is in particular a microelectronic data processing device.

In this application, the term "image morphing" is also used as an alternative to the term "image fusion", but with the same meaning.

Elastic fusion transformations (for example, image fusion transformations) are in particular designed to enable a seamless transition from one data set (for example a first data set such as for example a first image) to another data set (for example a second data set such as for example a second image). The transformation is in particular designed such that one of the first and second data sets (images) is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are in particular vectors of a deformation field. These vectors are determined by the optimisation algorithm which results in an optimum degree of similarity. Thus, the optimum degree of similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), in particular in order to avoid pathological deformations (for instance, all the voxels being shifted to the same position by the transformation). These constraints include in particular the constraint that the transformation is regular, which in particular means that a Jacobian determinant calculated from a matrix of the deformation field (in particular, the vector field) is larger than zero, and the constraint that the transformed (deformed) image is not self-intersecting and in particular that the transformed (deformed) image does not comprise faults and/or ruptures. The constraints include in particular the constraint that if a regular grid is transformed simultaneously with the image and in a corresponding manner, the grid is not allowed to interfold at any of its locations. The optimising problem is in particular solved iteratively, in particular by means of an optimisation algorithm which is in particular a first-order optimisation algorithm, in particular a gradient descent algorithm. Other examples of optimisation algorithms include optimisation algorithms which do not use derivations such as the downhill simplex algorithm or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are in particular shifted by a magnitude in a direction such that the degree of similarity is increased. This magnitude is preferably less than a predefined limit, for instance less than $\frac{1}{10}$ or $\frac{1}{100}$ or $\frac{1}{1000}$ of the diameter of the image, and in particular about equal to or less than the distance between neighbouring voxels. Large deformations can be implemented, in particular due to a high number of (iteration) steps.

The determined elastic fusion transformation can in particular be used to determine a degree of similarity (or similarity measure, see above) between the first and second data sets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can in particular be determined on the basis of a determined correlation between the first and second data sets.

DESCRIPTION OF THE FIGURES

In the following, a preferred embodiment of the present invention is described with reference to the Figures, wherein

FIG. 2 shows a more detailed workflow for generating an individualised, i.e. patient-specific, atlas of the brain. In step S1, an individual image of the brain of the patient is received, i.e. acquired; this step is implemented in particular in block B1 of FIG. 1. In subsequent step S2, the individual brain image is parcellated (i.e. partitioned, for example segmented) into disjunct modules, representing the patient substructure representations. These modules are for example analysed with regard to their anatomical characteristics, which may be done for example based on comparing the respective part of the individual brain image to predetermined atlas information describing a representation (for example an image representation) of an anatomical body part corresponding to the module. In the case of FIG. 2, it is for example determined that the module highlighted by the rectangular box in step S2 is the temporal cortex. The boundaries between the individual modules are indicated by dashed lines in FIG. 2. Step S3 then continuous with determining and/or identifying a matching subtype, i.e. a matching general substructure representation for each one of the modules determined in step S2. The matching subtypes determined in step S3 are then assembled in step S4 to constitute a patient-specific brain atlas which is generated from the matching subtypes for each module. In step S5, an elastic fusion embodying the atlas patient matching transformation APT is determined between the brain atlas generated in step S4 and the individual brain image received in step S1.

Figure 1:
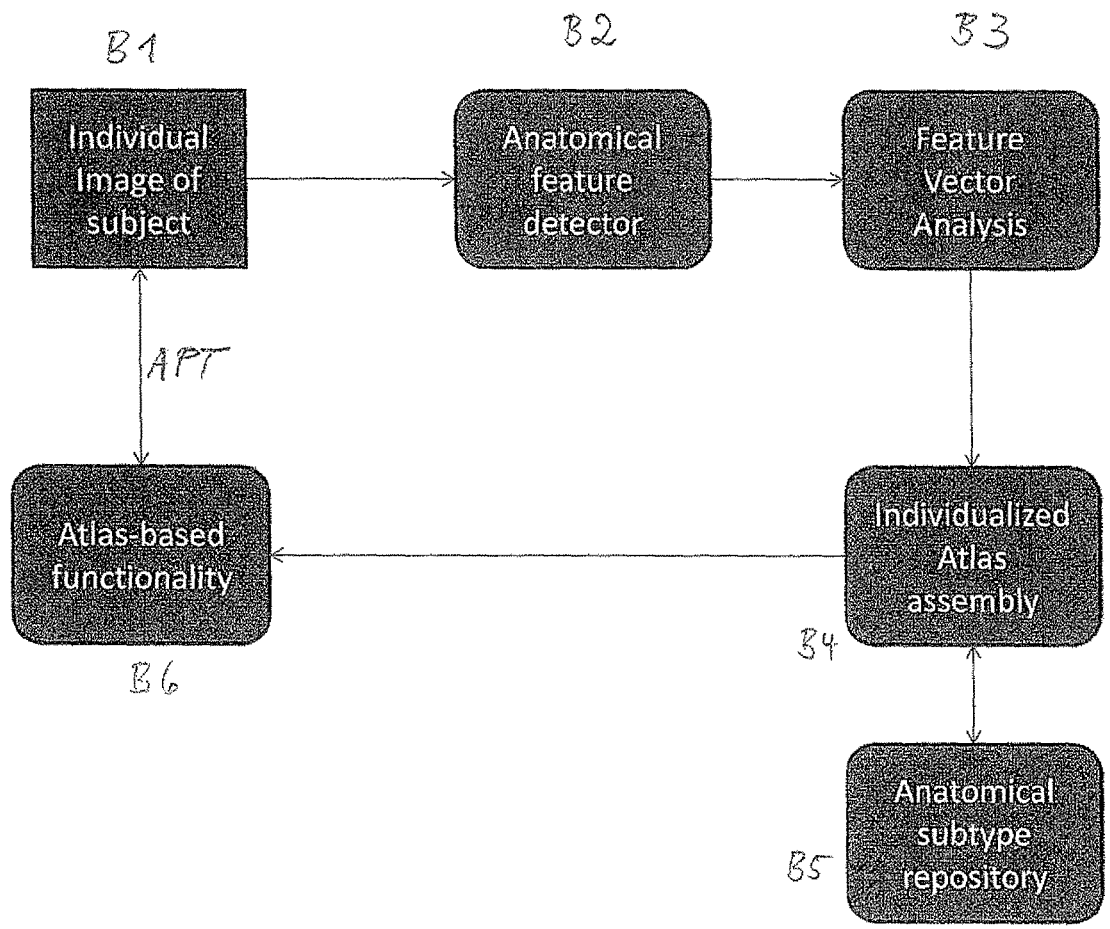
FIG. 1 shows the relationship of data processing blocks for implementing the inventive method.
Figure 2:
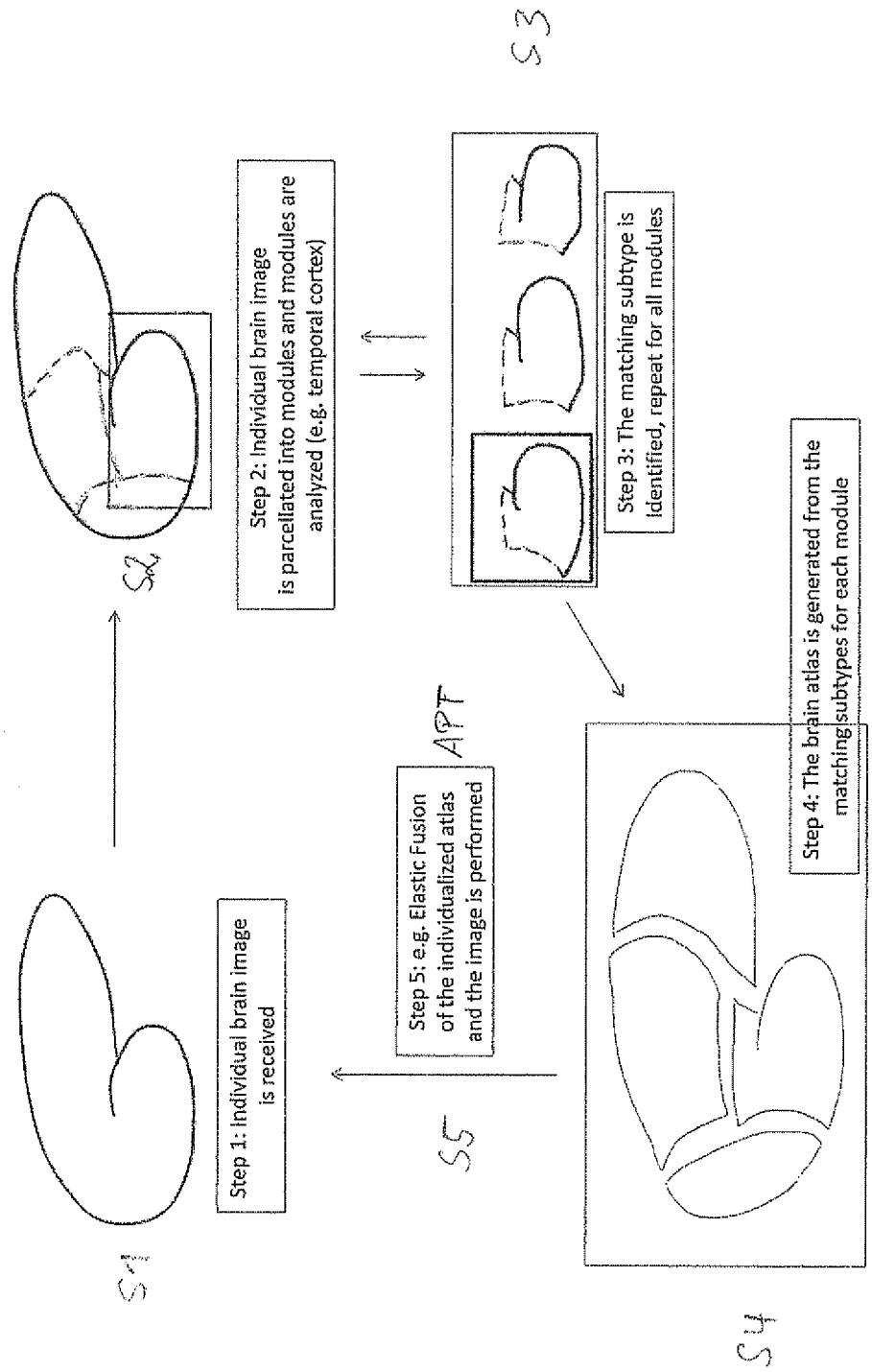
FIG. 2 shows an example workflow for generating a patient-specific atlas of the brain.

Step S2 is implemented in particular in blocks B2 and B3 of FIG. 1; steps S3 and S4 are implemented in particular in blocks B4 and B5 of FIG. 1, step S5 is implemented in particular in block B6 of FIG. 1.

Figure 3:
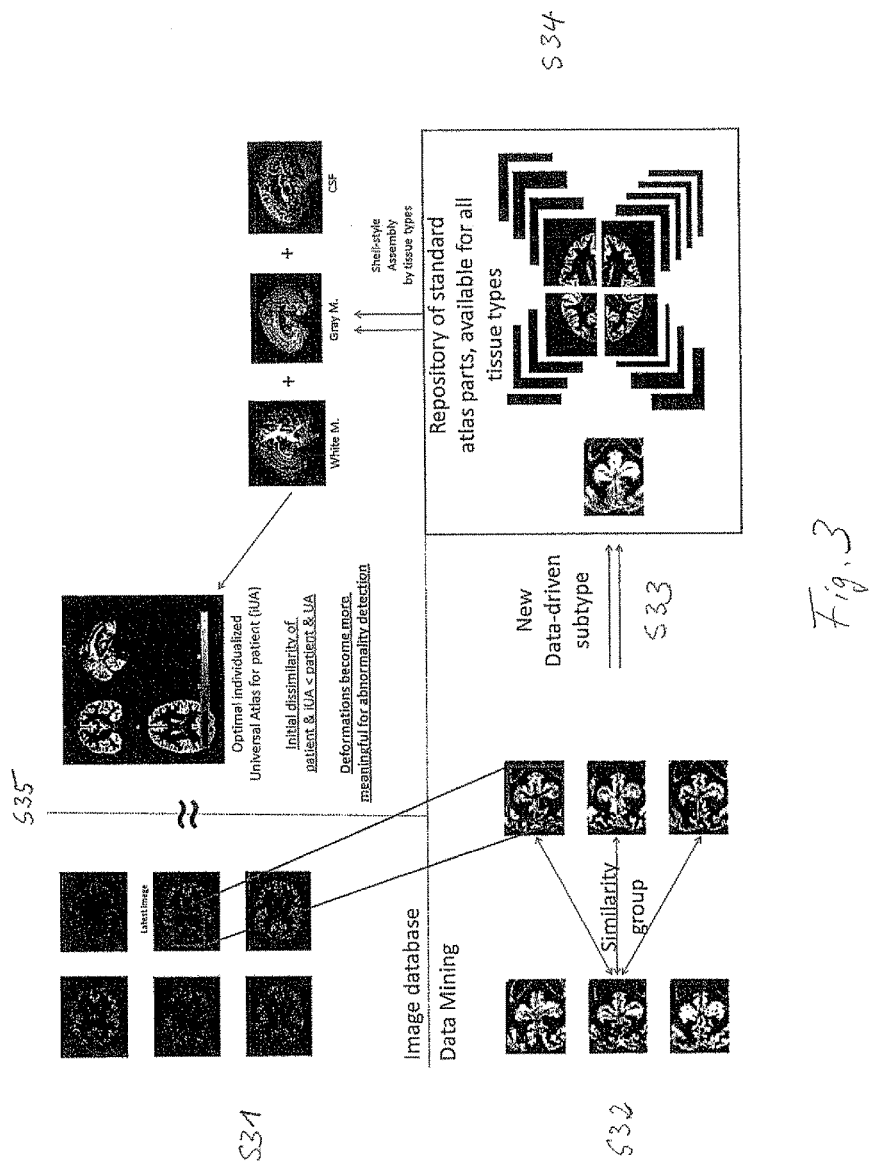
FIG. 3 shows a way of generating general substructure representations. According to FIG. 1, data processing block B1 contains the step of acquiring the patient image data which describes an individual image of a subject, i.e. of a patient. The method then continuous with block B2 which represents an anatomical feature detector which is configured to in particular determine the patient's substructure data based on the individual image of the subject. In block B3, a feature vector analysis is carried out on the patient's substructure representations in order to for example determine image features (which in particular represent anatomical features of interest and/or are characterized by specific image properties as described above). Based on the result of the feature vector analysis, an individualised atlas representation of the anatomical structure shown in the individual image of the subject is determined. In order to do so, the general substructure representations are acquired from an anatomical subtype repository in block B5. The anatomical subtype repository contains in particular the general substructure data. Block B4 is directed in particular to determining the substructure matching data and the anatomical atlas data. The individual atlas determined in block B4 is the atlas representation of the anatomical structure which then can for example in block B6 be saved in order to provide atlas-based functionality to determine the atlas-patient matching transformation APT between the individualised atlas and the individual image of the subject.

FIG. 3 illustrates in particular a procedure for generating the general substructure representations. In Step S31 a plurality of individual medical images containing a representation of the anatomical structure of different subjects is acquired from an image data base. From each one of these medical images, an individual substructure representation is determined. In subsequent step S32, a similarity group for this plurality of individual substructure representations is determined by way of data mining (for example by applying an image segmentation algorithm to the individual substructure representations and/or evaluating representation classes of the individual substructure representations which describe the known image appearance of specific physical structures such as tissues or fluids in the medical images). A new data-driven subtype, i.e. a new general substructure representation is then determined based on the similarity group by merging the similar individual substructure representations as described above, Steps S31 and S32 and S33 are repeated for each patient substructure. In particular, the individual substructure representations acquired in step S31 describe an anatomical body part which corresponds to one specific patient substructure. Thus, a data-driven subtype is determined in Step S33 for each general substructure and therefore for each one of the patient substructures. Preferably, a plurality of data-driven subtypes is generated for each patient substructure, and the matching data-driven subtype which matches the respective patient substructure representations is determined. The matching data-driven subtypes are then assembled in Step S34 in a shell style for example starting with subtypes representing harder tissue and then continuing with subtype representing softer tissue. The information about the type of tissue described by the subtypes is determined preferably on the above-described representation class information which is preferably known to the inventive method and in particular at least associated with (more preferably contained in) the image data describing the data-driven subtype (i.e. the general substructure representation). Thus, a repository of standard atlas parts describing the anatomical structure which is available for all types of tissue types is assembled. Since FIG. 3 shows the case of generating an atlas representation of the brain, the assembly starts for example with generating the part of the atlas representation showing the white brain matter, to which a generated representation of the grey brain matter is added, and then finally adding a general representation of the cerebral spinal fluid (CSF). The result is an optimal individualised universal atlas for a specific patient which is also abbreviated as iUA and is a patient-specific atlas. In step S35, the atlas-patient transformation APT is then determined to gain for example information about deformations which are meaningful for anomality detection (for example for detection of pathological conditions in the brain). Such an anomality can for example be detected if it is determined that there is a difference between a matching transformation between the patient image and the individualised universal atlas image and a transformation between the patient image and a standard universal atlas (abbreviated as UA) which is not patient-specific. Such a standard universal atlas image representing the anatomical structure has been generated in particular without joining general substructure representations and therefore is a coarser standard representation of the anatomical structure compared to the individualised universal atlas.

The invention claimed is:

1. A medical image processing system, comprising a computer which is configured to execute a computer-implemented medical image processing method of matching a medical image of an anatomical structure of a patient's body with an atlas-based representation of the anatomical structure, the medical image processing method comprising executing, on at least one processor of a computer, steps of:

acquiring, by the at least one processor, patient image data describing a medical image representation of the anatomical structure in the medical image;

determining, by the at least one processor and based on the patient image data, patient substructure data describing a plurality of patient substructure representations each describing a different patient substructure of the anatomical structure;

acquiring, by the at least one processor, general substructure data describing a general substructure representation of each of a plurality of general substructures for each of the patient substructures;

determining, by the at least one processor and for each of the patient substructures and based on the patient substructure data and the general substructure data, substructure matching data describing a matching general substructure representation which, without being deformed, matches the respective patient substructure representation;

outputting, by the at least one processor and based on the general substructure data and the substructure matching data, anatomical structure atlas data describing an atlas representation of the anatomical structure;

determining, by the at least one processor and based on the patient image data and the anatomical structure atlas data, matching transformation data describing an atlas-patient matching transformation between the medical image representation of the anatomical structure and the atlas representation of the anatomical structure.

2. A computer-implemented medical image processing method of matching a medical image of an anatomical structure of a patient's body with an atlas-based representation of the anatomical structure, the method comprising executing, on the at least one processor of a computer, the steps of:

acquiring, by the at least one processor, patient image data describing a medical image representation of the anatomical structure in the medical image;

determining, by the at least one processor and based on the patient image data, patient substructure data describing a plurality of patient substructure representations each describing a different patient substructure of the anatomical structure;

acquiring, by the at least one processor, general substructure data describing a general substructure representation of each of a plurality of general substructures for each of the patient substructures;

determining, by the at least one processor and for each of the patient substructures and based on the patient substructure data and the general substructure data, substructure matching data describing a matching general substructure representation which, without being deformed, matches the respective patient substructure representation;

outputting, by the at least one processor and based on the general substructure data and the substructure matching data, anatomical structure atlas data describing an atlas representation of the anatomical structure;

determining, by the at least one processor and based on the patient image data and the anatomical structure atlas data, matching transformation data describing an atlas-patient matching transformation between the medical image representation of the anatomical structure and the atlas representation of the anatomical structure.

3. The method according to claim 2, wherein the patient substructure data comprises patient substructure feature data describing at least one feature of each of the patient substructure representations;

the general substructure data comprises general substructure feature data describing a feature of each of the general substructure representations;

wherein the substructure matching data is determined, by the at least one processor, based on the patient substructure feature data and the general substructure feature data.

4. The method according to claim 3, wherein the feature described by the patient substructure feature data and the general substructure feature data includes at least one of the following:

geometry, such as at least one of the position, shape inner structure and morphology, of at least one of the patient substructures and the general substructures, respectively;

at least one of a gender, a handedness, an ethnicity, a species, a pathological condition, and a physiological or anatomical abnormality associated with at least one of the patient substructure representation and the general substructure representation, respectively;

image properties such as at least one of the texture, colour values, and contrast of at least one of the patient substructure representation and the general substructure representation, respectively.

5. The method according to claim 4, wherein determining the substructure matching data includes determining, by the at least one processor, a category of the patient substructure based on the patient substructure feature data and determining, by the at least one processor, a category of each of the general substructures based on the general substructure feature data, wherein the substructure matching data is determined, by the at least one processor, based on comparing the category of the patient substructure and the category of the general substructure.

6. The method according to claim 2, wherein determining the substructure matching data includes determining, by the at least one processor and based on the general substructure feature data, a category of the patient substructure based on the patient substructure feature data, a category of the patient based on the category of the patient substructure and a category of each of the general substructures, wherein the substructure matching data is determined based on comparing the category of the patient and the category of each of the general substructures.

7. The method according to claim 2, wherein the general substructure data is acquired based on determining, by the at least one processor and from a plurality of medical images, a corresponding plurality of individual substructure representations, determining, by the at least one processor and from the plurality of individual substructure representations, a similarity group comprising similar individual substructure representations which share a similar feature, determining, by the at least one processor and based on the similarity group, the general substructure representation by combining the similar individual substructure representations.

8. The method according to claim 2, wherein determining the substructure matching data includes determining, by the at least one processor, a substructure matching transformation between the patient substructure representation and the matching one of the general substructure representations.

9. The method according to claim 8, wherein determining the substructure matching data includes determining, by the at least one processor and as the matching general substructure representation, the general substructure representation which is associated with a substructure matching transformation which fulfils a predetermined condition.

10. The method according to claim 2, wherein the substructure matching data is determined, by the at least one processor, based on determining, by the at least one processor, a measure of similarity between the patient substructure representation and the general substructure representation, wherein the measure of similarity is determined, by the at least one processor, based on the patient substructure feature data and the general substructure feature data.

11. The method according to claim 2, wherein the atlas representation of the anatomical structure includes an atlas image representation of the anatomical structure.

12. The method according to claim 2, wherein the patient substructures and the general substructures are spatially disjunct, and wherein the anatomical structure atlas data is determined, by the at least one processor, based on joining the matching general substructure representations.

13. The method according to claim 12, wherein the matching general substructures are joined based on information about tissue types described by the general substructures.

14. The method according to claim 12, wherein the joining includes deforming at least one of the matching general substructure representations, or wherein the joining is performed without deforming the matching general substructure representations.

15. The method according to claim 13, wherein empty spaces between the matching general substructure representations are compensated for by introducing predetermined space compensator representations into the empty spaces or by adapting the boundaries of neighboring general substructure representations to one another.

16. The method according to claim 2, wherein the general substructure data has been generated based on medical information about a plurality of human bodies.

17. A non-transitory computer-readable program storage medium storing a computer program which, when running on an at least one processor of a computer or when loaded into a memory of a computer, causes the computer to perform a computer-implemented medical image processing method of matching a medical image of an anatomical structure of a patient's body with an atlas-based representation of the anatomical structure, the method comprising executing, on the at least one processor, the steps of:

acquiring, by the at least one processor, patient image data describing a medical image representation of the anatomical structure in the medical image;

determining, by the at least one processor and based on the patient image data, patient substructure data describing a plurality of patient substructure representations each describing a different patient substructure of the anatomical structure;

acquiring, by the at least one processor, general substructure data describing a general substructure representation of each of a plurality of general substructures for each of the patient substructures;

determining, by the at least one processor and for each of the patient substructures and based on the patient substructure data and the general substructure data, substructure matching data describing a matching general substructure representation which, without being deformed, matches the respective patient substructure representation;

outputting, by the at least one processor and based on the general substructure data and the substructure matching data, anatomical structure atlas data describing an atlas representation of the anatomical structure;

determining, by the at least one processor and based on the patient image data and the anatomical structure atlas data, matching transformation data describing an atlas-patient matching transformation between the medical image representation of the anatomical structure and the atlas representation of the anatomical structure.

18. A computer comprising the program storage medium according to claim 17.

* * * * *